United States Patent Office 3,058,961
Patented Oct. 16, 1962

3,058,961
POLYMERIZATION OF VINYLIC NITROSO COMPOUNDS AND PRODUCTS THEREOF
Robert N. Haszeldine, Windyridge, Lyme Road, Disley, England
No Drawing. Filed Oct. 17, 1960, Ser. No. 62,839
Claims priority, application Great Britain Oct. 27, 1959
34 Claims. (Cl. 260—87.5)

This invention relates to new chemical compounds containing carbon and nitrogen. In particular it relates to compounds obtained by the polymerization of vinylic nitroso compounds.

Nitrogen containing polymers have been prepared by the copolymerization of compounds such as tetrafluoroethylene and trifluoronitroso methane. Generally speaking these polymers have a chain formed of repeating units of the type

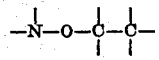

They show good thermal stability and can be used for flame resistant coatings and the like.

The present invention is based upon the discovery that vinylic nitroso compounds can be polymerized to form high molecular weight materials. The structure of these materials will depend on the formula of the monomer. In physical appearance they vary from mobile liquids to greases and elastomers and are useful as solvent resistant gaskets and tubing and as temperature resistant greases and lubricants.

Thus if the vinylic nitroso monomer, polymerized in accordance with the invention, be considered to have the skeletal structure

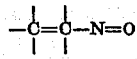

the following skeletal chains can be distinguished.

(I) 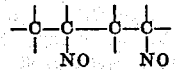

This structure arises from normal vinyl polymerization through the —C=C— linkage in the monomer.

(II) 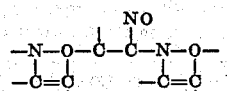

This structure, in which vinyl and nitroso groups alternate as side chains, arises from formation of the

—N—O—C—C— chain by reaction of the nitroso group of one molecule with the vinyl group of a second.

(III) 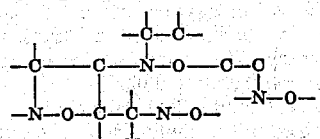

Highly cross-linked polymers of this structure are formed by inter-reaction of the side chains of II.

(IV) 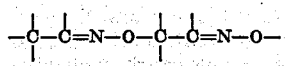

Polymers of this structure arise by the reaction of the vinylic nitroso monomer as a diene to give a linear chain containing

groups.

(V) 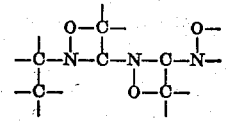

Polymers of this type, having a skeletal chain consisting of alternating carbon and nitrogen atoms are a result of oxazetidine ring formation.

It will be understood that a given vinylic nitroso compound may upon polymerization give two or more homopolymers of different structures. Molecular weights may range from say 1000 to 500,000 or higher.

In its broadest aspect, the invention therefore comprises homopolymers of vinylic nitroso compounds; together with a method for making polymeric compounds containing carbon and nitrogen which comprises polymerizing vinylic nitroso compounds.

The vinylic nitroso compounds of choice which are used to form homopolymers in accordance with the invention may be represented by the formula

CYZ=CXNO where X is flourine or chlorine and Y and Z each represents hydrogen, fluorine, chlorine or a polyfluoro- or polyfluorochlorohydrocarbon usually containing not more than 10 and preferably not more than 5 carbon atoms and which may contain non-interfering substituents. When Y or Z represents a polyfluoro or polyfluorochloro group, such group is typified by perfluoro- or perfluorochloroalkyl, e.g. perfluoromethyl.

The invention therefore further comprises homopolymers of vinylic nitroso compounds having the formula

CYZ=CXNO where X is fluorine or chlorine and Y and Z are hydrogen, fluorine, chlorine or a polyfluoro or polyfluorochlorohydrocarbon group containing not more than 10 carbon atoms; as well as a method for making polymers containing carbon and nitrogen which comprises polymerizing a monomer of the formula

CYZ=CXNO

Preferably, the vinylic nitroso compound has the formula $CF_2$=CXNO where as above, X is fluorine or chlorine. In this case the polymeric product is that of Formula V above and more specificaly has a chain characterized by repeating units of the type (VI) 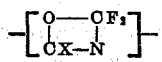

It will be observed that in the polymeric compounds of Formula VI, the skeletal chain has alternating carbon and nitrogen atoms. Such chains are thus quite different from those of the known copolymers identified above.

In a further aspect the invention therefore comprises polymeric compounds having skeletal chains comprising alternating carbon and nitrogen atoms; together with a process for making such compounds comprising polymerizing a monomer of the formula $CF_2$=CXNO More specifically the invention additionally comprises polymeric products having chains characterized by the repeating unit

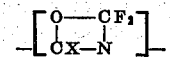

and to a method for making such products by polymerization of monomers having the formula $$CF_2=CXNO$$

In general, the reaction to give a homopolymer of a vinylic nitroso compound is carried out by subjecting the compound to conditions conducive to the formation of free radicals. This may involve subjecting the starting material to energization by heat, ultra-violet, infra-red, X, γ or high energy electron radiation or by utilizing an initiator such as peroxide or azo-type initiator. Both temperature and pressure are important factors in the reaction and should be appropriately chosen for the particular vinylic nitroso compound subjected to polymerization. In general, temperatures from −50 to 150° C. and pressures from 5 to 300 atmospheres will be used. Reaction time will vary from ½ to say 48 hours depending on other reaction conditions, especially pressure. By way of guidance, it may be stated that to prepare a homopolymer of formula VI from trifluoronitrosoethylene, the polymerization may be effected at a pressure of say 5 atmospheres to 200 atmospheres, at a temperature in the range from about 20 to about 200° C. and in the presence of an initiating agency such as ultra-violet light; preferred temperatures range from about 50°C. to about 100° C. and preferred pressures range from about 20 to about 60 atmospheres.

The polymers prepared as described above may take the form of mobile liquids, viscous liquids, greases or elastomers. For example, the homopolymer of trifluoronitrosoethylene is an elastomer which has good low temperature characteristics, which is insoluble in organic solvents to which rubbers might commonly be exposed in use but which is soluble in a fluorinated solvent such as perfluoromethylcyclohexane thus enabling it to be formed into films by applying a solution thereof to a substrate and evaporating the solvent.

The products of most interest and utility, e.g. as lubricants used at high temperatures or as elastomers, are those prepared from perfluoro vinylic nitroso compounds.

The homopolymers of Formula VI may be isotactic, atactic, or syndotactic and the formulae used herein are not intended to denote any particular stereospecific polymer structures.

In preparing oxazetidine type homopolymers (Formula VI) from compounds of the type $$CF_2=CXNO$$

there may be obtained in addition to the polymer described above, a fused ring dimer of formula

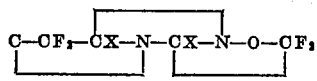

For example, when trifluoronitrosoethylene is polymerized, there results in addition to an elastomer, the fused ring dimer

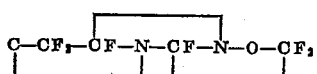

These fused dimers are produced under the same conditions which give rise to the oxazetidine type homopolymers. They are new materials, useful as solvents and they and their preparation comprise yet further aspects of the invention.

It has further been discovered that polymers of the type identified by Formula VI above can be pyrolyzed to give, as a pyrolysis product, an unsaturated polymer characterized by a chain of the type

The mechanism by which this is obtained may be depicted as follows:

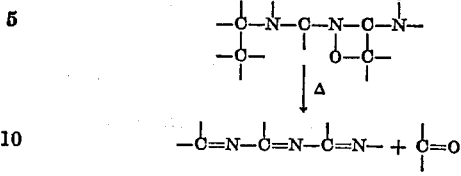

Where the oxazetidine polymer was made from a monomer $CF_2=CXNO$, the product obtained has a chain $$—CX=N—CX=N—CX=N—$$

In the specific case of a polymer having the structure

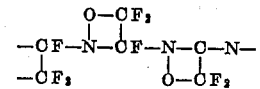

The chain (VII) $$=CF—N=CF—N=CF—N=$$

is obtained.

These products and the pyrolysis process by which they are made comprise a still further aspect of the invention.

In general the pyrolysis is conducted at say 150° C. to 600° C., with time adjusted to temperature so that the C—N bond is not broken. For example, at around 400° C. times on the order of 5 seconds to 5 hours are satisfactory. Pressure is not critical and is desirably about atmospheric. It may, however, range from say 1 to 300 atmospheres.

The unsaturated polymers just described exhibit great thermal stability which makes them useful where such stability is necessary, e.g. in the manufacture of laboratory fittings for apparatus to be used at high temperatures.

It has further been discovered that the vinylic nitroso compounds which produce homopolymers as described above also form copolymers with fluoroalkenes. Thus, for example, useful chemically resistant oils, greases, waxes and, in some cases, elastomers may be prepared by copolymerizing a perfluoro- or perfluorochloro-vinylic nitroso compound with a polyfluoroalkene. If the fluorinated vinylic nitroso compound be represented as $R_fNO$ and the recurring unit present in the copolymer and which is derived from the fluoroalkene be represented as $R'_f$, then copolymers having a repeating unit of the following type may be produced, viz.

(VIII) 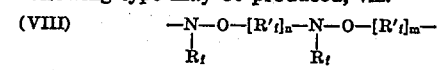

where $n$ and $m$ are integers of 1 to 30. While the values of $n$ and $m$ depend upon the fluoroalkene used, it is generally the case that the copolymers consist either predominantly or exclusively of a 1:1 copolymer, i.e. a copolymer in which $n$ and $m$ in Formula VIII each have a value of one. The copolymers may range in molecular weight from say 5000 to 500,000.

By virtue of the vinylic $R_f$ side chains which distinguish the copolymer of Formula VIII from previously known copolymers having a —N—O—C—C— repeating unit but no vinylic unsaturation in the side chains, the copolymers can be cross-linked to give insoluble infusible products. Cross-linking may be effected by means of peroxides or by reaction of the copolymers with polyfunctional compounds such as diamines and diols. The vinylic $R_f$ groups in the copolymers may also be converted into other functional groups, e.g. to carboxylic acid groups by reaction with an oxidizing agent such as potassium permanganate.

Preferred fluoroalkenes used to form copolymers with vinylic nitroso compounds are those of the formula $R_aR_bC=CF_2$, where $R_a$ and $R_b$ represent fluorine, chlorine, hydrogen, alkyl and fluoroalkyl, chloroalkyl and fluorochloroalkyl groups having not more than say 10 carbon atoms. Typical fluoroalkenes are the compounds $CF_2=CF_2$, $CF_2=CCl_2$ and $CF_2=CFCl$. These latter compounds copolymerize with vinylic nitroso compounds of the type $CF_2=CXNO$ where X is fluorine and chlorine, to form 1:1 copolymers having the characteristic repeating unit (IX)  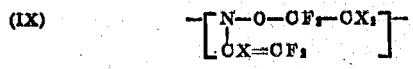

where X is fluorine or chlorine.

The invention thus further comprises copolymers of vinylic nitroso compounds and fluoroalkenes, together with a method for making polymeric products containing fluorine, nitrogen and carbon which comprises copolymerizing a vinylic nitroso compound with a fluoroalkene.

In the reaction between a vinylic nitroso compound and a fluoroalkene, an oxazetidine compound can also be produced. For example, reaction of a nitroso compound $CF_2=CXNO$ with a fluoroalkene of the formula $CF_2=CX_2$ yields an oxazetidine compound of the formula (X)  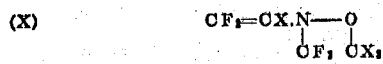

The invention therefore further includes oxazetidine compounds of this general formula and the method by which they are made.

It may be pointed out that copolymers of Formula VIII and oxazetidine compounds of the type exemplified by Formula X are not necessarily the only products which can be formed by the reaction of a vinylic nitroso compound and a fluoroalkene. In particular copolymers of other structures may result. For example, when vinylic nitroso compounds other than those of formula $CF_2=CXNO$ are used, saturated copolymers may result from normal vinyl polymerization through the C=C linkages in the vinylic nitroso compound and the fluoroalkene.

In accordance with the invention the reaction of the vinylic nitroso compound and a fluoroalkene will, in general, be conducted at temperatures from $-50°$ C. to $150°$ C., at pressures from 1 to 300 atmospheres, with fluoroalkene:nitroso compound molar ratios of from 1:10 to 10:1, preferably about 1:1 and at reaction times of say ½ to 48 hours. Obviously, however, the optimum temperature and pressure to be used will depend upon the identity of the nitroso compound and the fluoroalkene reactants and the nature of the desired product. For example, a copolymer of the structure of Formula IX results when perfluoronitrosoethylene and tetrafluoroethylene and/or trichlorofluoroethylene are polymerized at a temperature from $-30°$ C. to $30°$ C., particularly around $0°$ C., and a pressure of from 1-50 atmospheres; in contrast the formation of an oxazetidine compound is favored when these compounds are reacted at higher temperatures of about $50°$ C.–$100°$ C. When a more difficultly polymerizable fluoroalkene is used, e.g. perfluoropropene, in conjunction with a vinylic nitroso compound of formula $CF_2=CFXNO$, copolymer formation will be favored by higher temperatures, e.g. in the range from 40–$80°$ C. in conjunction with higher pressures of, say, 5–40 atmospheres.

Whether an elastomer can be produced will depend on the nature of the comonomers used. If the comonomers used are those capable of yielding an elastomer, then careful purification of reactants is a factor conducive to elastomer formation.

The reaction of the vinylic nitroso compound and the fluoroalkene may also, in certain cases, be catalyzed by small amounts, e.g. 1%, of $NO_2$ and by glass wool or other surfaces. The use of such catalysts is particularly indicated when the desired product is a copolymer of Formula VIII or an oxazetidine compound of the type represented by Formula X. Initiators such as ultra-violet light or a chemical initiator, such as a peroxide or azo compound, may also be employed. The use of chemical initiators is, however, not preferred because of the trouble of removing fragments of the initiator from the product.

As regards the fluoroalkenes which may be used in the copolymerization reaction with the nitroso compound, the compounds $CF_2=CF_2$, $CF_2=CFCl$, $CF_2=CCl_2$ and $CF_3CF=CF_2$ have already been specifically mentioned. Other compounds are $CF_2=CH_2$, $CF_2=CHF$ and compounds of the series $CF_3(CF_2)_nCF=CF_2$ where $n$ is an integer of not more than 20. For chemical stability and solvent resistance, perfluoro- or perfluorochloro- alkenes are preferred. On the other hand, when a hydrogen-containing polyfluoroalkene is used, the hydrogen enables the copolymers to be cross-linked by peroxides, amines, etc. and the copolymers, before cross-linking, are more soluble in conventional solvents such as acetone. Mixtures of polyfluoroalkenes may be used, if desired. Where asymmetrical polyfluoroalkenes are used, and reaction takes place by addition of the N—O group of the nitroso compound to the C=C groups of the alkene, there exists the possibility that the direction of the addition of the N—O group is not always the same. When the vinylic nitroso compound is $CF_2=CFNO$ or $CF_2=CClNO$ and elastomers are desired, alkenes of first choice are $CF_2=CF_2$, $CF_2=CHF$, $CF_2=CFCl$, and $CF_3CF=CF_2$; the polyfluoroalkene $CF_2=CH_2$ may also be used although in this case cross-linking of the copolymer is indicated in order to obtain an elastomer.

The varoius aspects of the invention described above are illustrated by the following examples. In the procedure described the reactants were carefully purified and, in particular, steps were taken to exclude air and moisture. Temperatures are in degrees centigrade.

EXAMPLE 1

*Dimerization and Homopolymerization of Trifluoronitrosoethylene*

Trifluoronitrosoethylene (20.1 mole) was sealed in a thick-walled, narrow-bore silica tube of 5 ml. capacity, together with chlorotrifluoromethane to give a maximum pressure at room temperature of 40 atmospheres. Precautions were taken in manipulating the tube which could cause serious damage on explosion. As soon as the tube reached room temperature, it was exposed first to infrared radiation to raise its temperature to approximately $80°$ and then, whilst still exposed to infra-red radiation, to ultra-violet radiation from a Hanovia lamp for 30 minutes. The tube was re-frozen in liquid nitrogen, opened, and the colorless gaseous products were distilled to give the dimer:

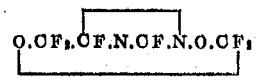

(56%) (Found: C, 21.4; N, 12.4%; mol. wt.=222. $C_4O_2N_2F_6$ requires C, 21.6; N, 12.6%; mol. wt.=222). The compound had a boiling point of $45°$ C. and was a colorless liquid. A mixture of a carbonyl fluoride, silicon tetrachloride and carbon dioxide was also obtained. There was no evidence for the formation of hexafluorobutadiene or its dimers etc. Ultra-violet and infra-red spectroscopic examination failed to reveal absorption associated with —N:O, —NO$_2$, —N:N—,

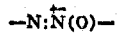

—ONO, —ONO$_2$, >N.O.NO, >N.NO, >N.NO$_2$, etc. groups; the weak general absorption in the ultra-violet spectrum in the 200–250 mμ region in particular, suggests that only the N—O single bond is present, as in the compound $(CF_3)_2N.O.CF_3$.

The residual material in the reaction tube was a colorless, translucent elastomeric gum, the homopolymer of trifluoronitrosoethylene,

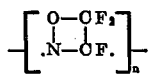

(28%) (Found: C, 21.7; N, 12.8% $(C_2ONF_3)_n$ requires C, 21.6; N, 12.6%). It was soluble in perfluoromethylcyclohexane but not in the common organic solvents, and had a molecular weight of approx. 100,000. Examination of the ultra-violet spectrum of a saturated solution in perfluoromethylcyclohexane, and of the infrared spectrum of a film on rock salt failed to reveal absorption associated with multiple carbon-oxygen, carbon-carbon, carbon-nitrogen, nitrogen-nitrogen, nitrogen-oxygen, etc. bonds, eliminating the structures I–IV above and establishing the cyclic structure indicated immediately above.

In contrast to the above experiment, when trifluoronitrosoethylene (2.1 mole) was irradiated with ultraviolet light in a 20 ml. Pyrex tube for 78 hours at 20°, no homopolymer or dimer was formed and the products were unchanged nitroso compound (3%), $CO_2$, $SiF_4$, $N_2O$, and hexafluorobutadiene. Comparison of this experiment with that described above indicates the marked and surprising effect of pressure upon dimer and homopolymer formation. Indeed from the low pressure experiment it might well have been concluded that trifluoronitrosoethylene would not undergo homopolymerization.

EXAMPLE 2

*Pyrolysis of Trifluoronitrosoethylene Homopolymer*

A 0.15 g. sample of the trifluoronitrosoethylene homopolymer prepared as in Example 1, was placed in a sealed silica tube and heated to 400°. The heating was continued for 2 hours. At 310° the polymer had become pale yellow and at 400° some shrinkage could be detected, although there was little further change in color. Examination of the volatile products revealed the presence of carbonyl fluoride (66%), and small amounts of silicon tetrafluoride and carbon dioxide. The residue was a pale yellow solid without elastomeric character, but was still soluble in perfluoromethylcyclohexane; the solution showed absorption at 5.65µ in the infra-red, to be associated with the —CF=N—CF= group indicating the product had the structure of Formula VII above. Its molecular weight was approx. 50,000.

EXAMPLE 3

*Reaction of Trifluoronitrosoethylene With Tetrafluoroethylene and Chlorotrifluoroethylene*

(A) Trifluoronitrosoethylene (7.2 mmole) and tetrafluoroethylene (7.2 mmole) heated in a 20 ml. Pyrex tube at 85° for 10 hours gave perfluoro-2-(trifluorovinyl)-1:2-oxazetidine (69%) (Found: C, 22.7; N, 6.5%; mol. wt.=211. $C_4ONF_7$ requires C, 22.8; N, 6.6%; mol. wt.=211), B.P. 41–43° (micro).

In a second experiment, triufloronitrosoethylene (7.4 mmole) and tetrafluoroethylene (7.4 mmole) reacted during 48 hours at 0° in a 50 ml. Pyrex tube with disappearance of the blue color to give the 1:1-copolymer $[\cdot(CF:CF_2)\cdot O \cdot CF_2CF_2 \cdot]_n$ (71%) (Found: C, 22.9; N, 6.4%. $C_4ONF_7$ requires C, 22.8; N, 6.6%). The molecular weight was about 100,000. The polymer was a thick colorless gel, which when triturated with ether gave a tough translucent elastomer, insoluble in the common organic solvents.

(B) When trifluoronitrosoethylene (4.0 mmole) and chlorotrifluoroethylene (4.0 mmole) were heated at 90° for 7 hours, the product was 4-chloro-2-(trifluorovinyl)-3:3:4-trifluoro-1:2-oxazetidine (57%). (Found: C, 21.0; N, 6.2%; mol wt.=226. $C_4NOClF_6$ requires C, 21.1; N, 6.2%; mol. wt.=227.5) B.P. 73–75°. No polymeric material was apparent, and all the nitroso-compound had disappeared.

In a parallel experiment carried out at 0° for two days the oxazetidine was not formed and the 1:1-copolymer $[\cdot N(CF:CF_2) \cdot O \cdot CF_2 \cdot CFCl \cdot]_n$ of the nitroso-compound and chlorotrifluoroethylene was isolated (53% yield) (Found: C, 21.2; N, 6.3%. $[C_4NOClF_6]_n$ requires C, 21.1; N, 6.2%) as an elastomer with good "snap."

The trifluoronitrosoethylene used in the above examples is representative of an entirely new class of chemical compounds and is a vivid deep blue gas (B.P. −23.7°) that shows no indication of association in liquid or vapor phase. Its ultra-violet spectrum shows the broad band in the 665–685mµ region shown earlier to be characteristic of the >CF·NO group. Its infra-red spectrum shows the typical $CF_2=CF$—absorption at 5.55µcf.

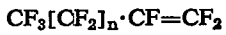

5.5µ together with the N:O stretching vibration at 6.25µ (cf. $CF_3 \cdot [CF_2]_n \cdot NO$, 6.23µ).

As regards the thermal stability of the compound, heating at 100° for 150 hours produces little degradation. On the other hand, the compound was totally destroyed when heated at 100° for 48 hours, then at 110° for 24 hours and finally at 125° for 48 hours.

Trifluoronitrosoethylene may be prepared by the photochemical reaction of nitric oxide with trifluoroiodoethylene. Starting with trifluoroethylene, the nitroso compound may be synthesized by the following route:

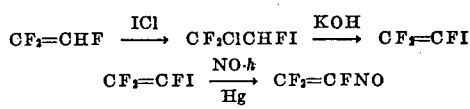

A typical preparation of trifluoronitrosoethylene by the photochemical reaction of nitric oxide with trifluoroiodoethylene is given in the experiment reported below:

EXPERIMENT

Trifluoroiodoethylene (5.45 g., 21.4 mmole), nitric oxide (1.61 g., 53.5 mmole) and mercury (100 ml.) in a 2.1 silica flask were irradiated for 48–76 hours with a 250 watt Hanovia ultra-violet lamp. The flask was shielded so that the surface of the mercury was not directly illuminated. The course of the reaction could be followed by the development of a faint blue color. The excess of nitric oxide was removed by admission of oxygen to the flask and agitation of the mercury to remove final traces of dinitrogen tetroxide, and the volatile products were slowly pumped (1 hr.) through two traps in series cooled by liquid nitrogen. Distillation gave unchanged trifluoroiodoethylene (1%), trifluoronitrosoethylene (0.219 g., 1.99 mmole; 9%). (Found: C, 21.8; N, 12.3%; and mol. wt.=111. $C_2ONF_3$ requires C, 21.6; N, 12.6%; mol. wt.=111), and a mixture of carbon dioxide, carbonyl fluoride, and silicon tetrafluoride (21.0 mmole).

I claim:

1. Polymers of vinylic nitroso compounds said polymers having a chain of which the nitrogen atom of the nitroso compound is an integral part.

2. Homopolymers of vinylic nitroso compounds, said compounds having the general formula

where X is selected from the group consisting of fluorine and chlorine and Y and Z are selected from the group consisting of hydrogen, fluorine, chlorine and polyfluoro- and polyfluorochlorohydrocarbon groups having not more than 10 carbon atoms, and said homopolymers having a chain of which the nitrogen atom of the nitroso compound is an integral part.

3. Homopolymers of vinylic nitroso compounds having a skeletal chain of alternating carbon and nitrogen atoms.

4. Homopolymers of vinylic nitroso compounds, said compounds having the formula $$CF_2=CXNO$$

where X is selected from the group consisting of fluorine and chlorine and said homopolymers having a chain, of which the nitrogen atom of the nitroso compound is an integral part.

5. A polymeric product having a chain characterized by the repeating unit $$-\left[\begin{array}{c}N-CX\\|\phantom{xx}|\\O-CF_2\end{array}\right]-$$

where X is selected from the group consisting of chlorine and fluorine.

6. A polymeric product having a chain characterized by the repeating unit $$-\left[\begin{array}{c}N-CF\\|\phantom{xx}|\\O-CF_2\end{array}\right]-$$

7. A polymeric product having a chain characterized by the repeating unit $$-N=CX-$$

where X is selected from the group consisting of chlorine and fluorine.

8. A polymeric product having a chain characterized by the repeating unit $$-N=CF-$$

9. Compounds having the general formula

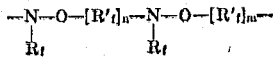

where X is selected from the group consisting of fluorine and chlorine.

10. A compound having the formula

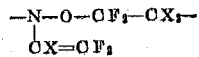

11. Copolymers of vinylic nitroso compounds and fluoroalkenes, said copolymers having a chain of which the nitrogen atom of the nitroso compound is an integral part.

12. Polymeric products having a chain characterized by the repeating unit $$-N-O-[R'_f]_n-N-O-[R'_f]_m-$$
$$\phantom{xxx}|\phantom{xxxxxxxxxxxxx}|$$
$$\phantom{xxx}R_f\phantom{xxxxxxxxxxxx}R_f$$

where $R_f$ is selected from the class consisting of perfluoroalkene and perfluorochlorovinyl groups, $R'_f$ is a fluoroalkylene group, and $m$ and $n$ are integers from 1 to 30.

13. Copolymers of vinylic nitroso compounds having the formula $CF_2=CXNO$ and fluoroalkenes having the formula $R_aR_bC=CF_2$ where X is selected from the group consisting of fluorine and chlorine and $R_a$ and $R_b$ are selected from the class consisting of fluorine, chlorine, hydrogen, alkyl and fluoroalkyl, chloroalkyl and fluorochloroalkyl groups said copolymers having a main chain of which the nitrogen atom of the nitroso compound is an integral part.

14. Polymeric products having a chain characterized by the repeating unit $$-N-O-CF_2-CX_2-$$
$$\phantom{xxxx}|$$
$$\phantom{xxx}CX=CF_2$$

where X is selected from the group consisting of fluorine and chlorine.

15. Polymeric products having a chain characterized by the repeating unit $$-N-O-CF_2-CF_2-$$
$$\phantom{xxxx}|$$
$$\phantom{xxx}CF=CF_2$$

16. Polymeric products having a chain characterized by the repeating unit $$-N-O-CF_2-CFCl-$$
$$\phantom{xxxx}|$$
$$\phantom{xxx}CF=CF_2$$

17. Compounds having the general formula $$CF_2=CX-N-O$$
$$\phantom{xxxxxxx}|\phantom{xx}|$$
$$\phantom{xxxxxxx}CF_2-CX_2$$

18. A compound having the formula $$CF_2=CF-N-O$$
$$\phantom{xxxxxxx}|\phantom{xx}|$$
$$\phantom{xxxxxxx}CF_2-CF_2$$

19. A compound having the formula $$CF_2=CF-N-O$$
$$\phantom{xxxxxxx}|\phantom{xx}|$$
$$\phantom{xxxxxxx}CF_2-CFCl$$

20. A method for forming polymeric compounds containing carbon and nitrogen atoms as integral parts of a main polymer chain which comprises subjecting vinylic nitroso compounds to conditions conducive to the formation of free radicals, said conditions including a temperature of between about –50 and about 150° C. and a pressure of between about 5 and about 300 atmospheres.

21. A method for forming polymeric compounds containing nitrogen and carbon atoms as integral parts of a main polymer chain which comprises subjecting a vinylic nitroso compound having the general formula $$CYZ=CXNO$$

where X is selected from the group consisting of fluorine and chlorine and Y and Z are selected from the class consisting of hydrogen, fluorine, chlorine and polyfluoro- and polyfluorochlorohydrocarbon groups having not more than 10 carbon atoms, to conditions conducive to the formation of free radicals, said conditions including a temperature between about –50 and about 150° C. and a pressure between about 5 and about 300 atmospheres.

22. A method for forming polymeric compounds having a skeletal chain of alternating carbon and nitrogen atoms which comprises subjecting a vinylic nitroso compound having the general formula $$CF_2=CXNO$$

where X is selected from the group consisting of chlorine and fluorine to conditions conducive to the formation of free radicals from said nitroso compound, said conditions including a temperature between about –50 and about 150° C. and a pressure between about 5 and about 300 atmospheres.

23. A method for making a polymeric product having a chain characterized by the repeating unit $$-\left[\begin{array}{c}O-CF_2\\|\phantom{xx}|\\N-CF\end{array}\right]-$$

which comprises subjecting the compound $$CF_2=CFNO$$

to conditions conducive to the formation of free radicals, said conditions including a temperature between about –50 and about 150° C. and a pressure between about 5 and about 300 atmospheres.

24. A method for making polymeric products having a chain characterized by the repeating unit $$-\left[\begin{array}{c}O-CF_2\\|\phantom{xx}|\\N-CX\end{array}\right]-$$

which comprises subjecting a vinylic nitroso compound having the formula $$CF_2=CXNO$$

where X is selected from the group consisting of fluorine and chlorine to conditions conducive to the formation of free radicals said conditions including a temperature between about –50 and about 350° C. and a pressure between about 5 and about 300 atmospheres.

25. A method for making compounds of the formula

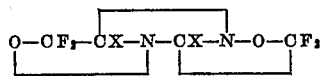

which comprises subjecting a vinylic nitroso compound having the formula $$CF_2=CXNO$$

where X is selected from the group consisting of fluorine and chlorine to temperature between about −50 and about 150° C. and a pressure of between about 5 and about 300 atmospheres.

26. A method for making a compound of the formula

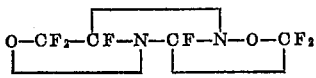

which comprises subjecting a compound of the formula $$CF_2=CFNO$$

to a temperature between about −50 and about 150° C. and a pressure between about 5 and about 300 atmospheres.

27. A method for making a polymeric product having a chain characterized by the repeating unit $$-N=CX-$$

where X is selected from the group consisting of fluorine and chlorine, which comprises subjecting a polymeric product having a chain characterized by the repeating unit

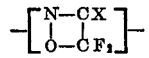

to pyrolysis at a temperature between about 150° C. and about 600° C.

28. A method for making polymeric products having a chain characterized by the repeating unit $$-N=CF-$$

which comprises subjecting a polymeric compound having a chain characterized by the repeating unit

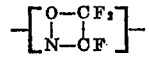

to pyrolysis at a tempterature between about 150° C. and about 600° C.

29. A method of making polymeric products having a chain characterized by the repeating unit

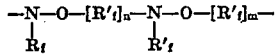

where $R_f$ is selected from the class consisting of perfluorovinyl and perfluorochlorovinyl groups, $R'_f$ is a fluoroalkylene group and m and n are integers from 1 to 30 which comprises copolymerizing a fluoroalkene with a compound having the formula at a temperature between about −50 and about 150° C. and at a pressure between about 1 and about 300 atmospheres $$R_fNO$$

30. A method of making polymeric products having a chain characterized by the repeating unit

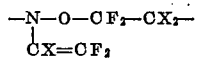

which comprises subjecting a mixture of compounds having the formula $CF_2=CXNO$ and compounds having the formula $CX_2=CF_2$, where X is selected from the group consisting of fluorine and chlorine, to conditions conducive to the formation of free radicals, said conditions including a temperature between about −50 and about 150° C. and a pressure between about 1 and about 300 atmospheres.

31. A method for making polymeric products having a chain characterized by the repeating unit

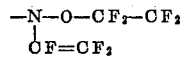

which comprises copolymerizing the compound $$CF_2=CFNO$$

with $CF_2=CF_2$ at a temperature between about −50 and about 150° C. and at a pressure between about 1 and about 300 atmospheres.

32. A method for making a compound having the general formula

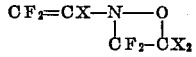

where X is selected from the group consisting of fluorine and chlorine which comprises reacting a compound having the formula $CF_2=CFXNO$ with a compound having the formula $CF_2=CX_2$ at a temperature between about −50 and about 150° C. and at a pressure of between about 1 and about 300 atmospheres.

33. A method for making a compound of formula

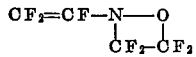

which comprises reacting the compound $CF_2=CFNO$ with the compound $CF_2=CF_2$ at a temperature between about −50 and about 150° C. and at a pressure of between tween about 1 and about 300 atmospheres.

34. A method for making a compound having the formula

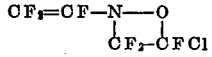

which comprises reacting the compound $CF_2=CFNO$ with the compound $CF_2=CFCl$ at a temperature between and −50 and about 150° C. and at a pressure of between about 1 and about 300 atmospheres.

References Cited in the file of this patent

FOREIGN PATENTS 1,159,935    France _____ July 3, 1958

OTHER REFERENCES

Takeuchi: Chemical Abstracts, vol. 47, page 11,916 (1953).

UNITED STATES PATENT OFFICE
CERTIFICATE OF CORRECTION

Patent No. 3,058,961                          October 16, 1962

Robert N. Haszeldine

It is hereby certified that error appears in the above numbered patent requiring correction and that the said Letters Patent should read as corrected below.

Column 3, lines 50 to 53, the formula should appear as shown below instead of as in the patent:

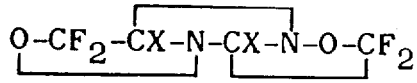

same column 3, lines 59 to 61, the formula should appear as shown below instead of as in the patent:

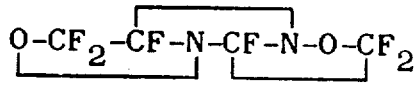

column 4, lines 46 and 47, for "fluoroinated" read -- fluorinated --; column 6, line 32, for "varoius" read -- various --; column 7, line 60, for "triufloronitrosoethylene" read -- trifluoronitrosoethylene --; line 64, the formula should appear as shown below instead of as in the patent:

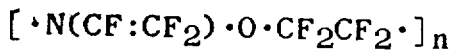

column 8, lines 16 to 19, for "typical $CF_2=CF$—absorption at 5.55μcf.

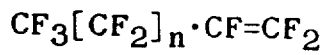

5.5μ together with the N:O stretching vibration at 6.25μ" read -- typical $CF_2=CF$—absorption at 5.55μ (cf. $CF_3[CF_2]_n \cdot CF=CF_2$, 5.56μ) together with the N:O stretching vibration at 6.25μ --; column 11, line 11, after "to" insert -- a --; line 46, for "tempterature" read -- temperature --; same column 11, line 60, strike out "$R_fNO$" and insert the same after "formula" in line 57, same column 11; column 12, line 42, strike out "tween"; line 50, for "and", first occurrence, read -- about --.

Signed and sealed this 21st day of May 1963.

(SEAL)
Attest:

ERNEST W. SWIDER                          DAVID L. LADD